(No Model.)
W. C. JAMES.
HAND TRUCK.
No. 356,473. Patented Jan. 25, 1887.
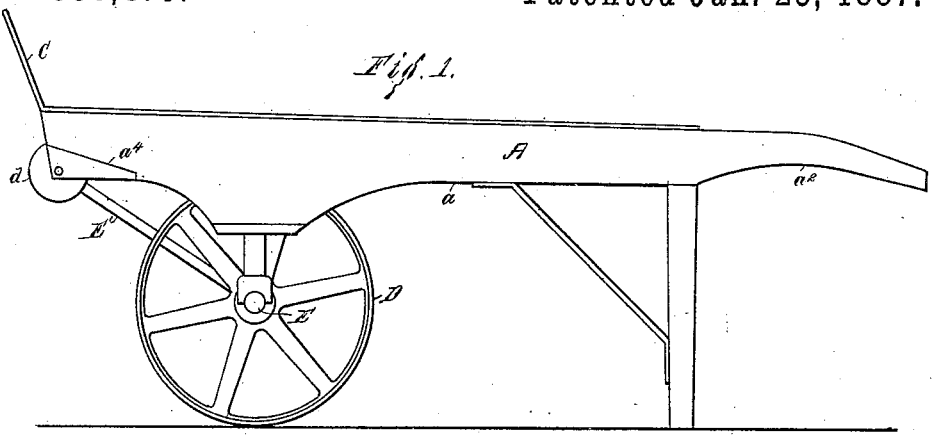
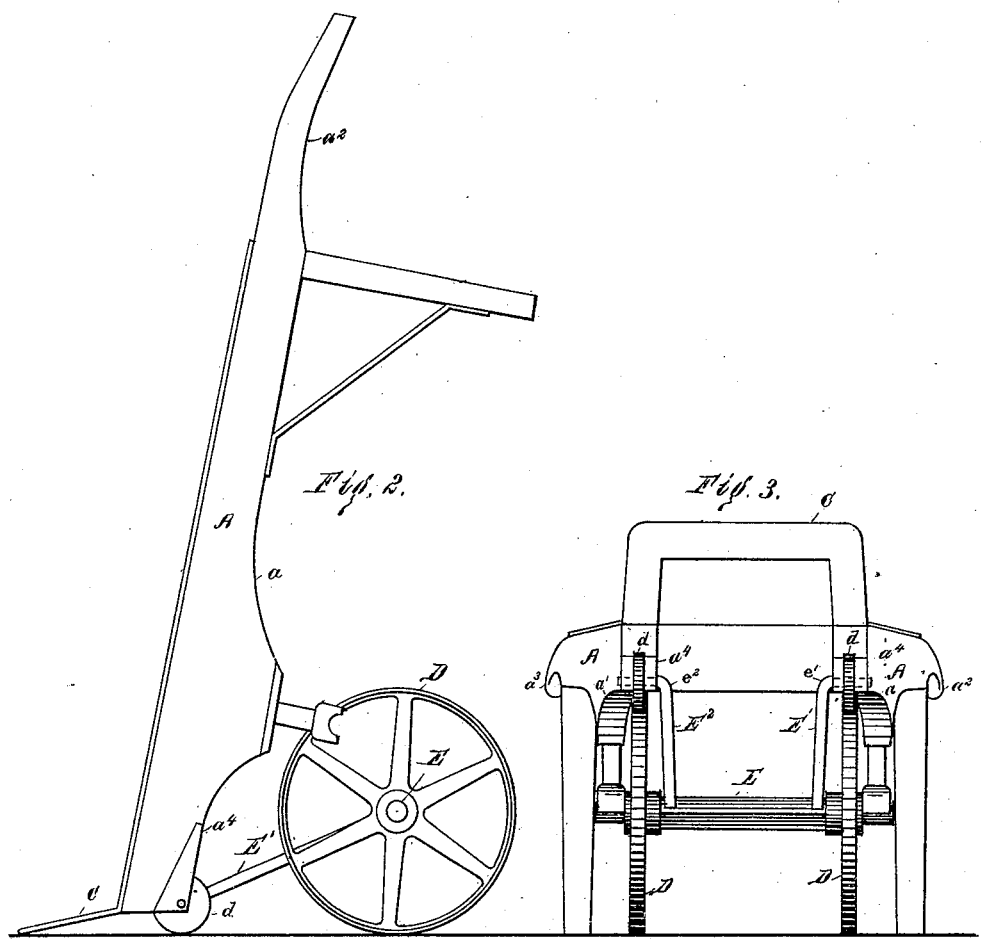
Witnesses
Kirkley Hyde,
Gertrude M. Day.
Inventor
Willard C. James,
By Albert M. Moore,
His Attorney.

UNITED STATES PATENT OFFICE.

WILLARD C. JAMES, OF BOSTON, MASSACHUSETTS.

HAND-TRUCK.

SPECIFICATION forming part of Letters Patent No. 356,473, dated January 25, 1887.

Application filed March 4, 1886. Serial No. 193,971. (No model.)

*To all whom it may concern:*

Be it known that I, WILLARD C. JAMES, a citizen of the United States, residing at Boston, in the county of Suffolk and Commonwealth of Massachusetts, have invented a certain new and useful Improvement in Hand-Trucks, of which the following is a specification.

My invention relates to hand-trucks; and it consists in the combinations hereinafter described and claimed, the same having for their object to facilitate the loading and propelling of the truck.

In the accompanying drawings, Figure 1 is a side elevation of my improved hand-truck resting upon the ground or floor; Fig. 2, a side elevation of the same raised into a position for loading; Fig. 3, a front elevation of said hand-truck.

The frame A of the truck consists of two side rails, $a$ $a'$, connected by cross-girts in the usual manner, the rear ends of the side rails being rounded and shaped to form suitable handles, $a^2$ $a^3$, as will be readily understood. To the front end of the frame is secured a toe-piece or lifting-piece, C, for the usual purpose of facilitating the loading of the truck by thrusting the lifting-piece under the load as it rests upon the ground or floor, and then depressing the handles of the truck.

The truck is provided at its front end with a pair of wheels, $d$, of small diameter, which are journaled to the frame, as described below, the position of these wheels and their small diameter allowing the toe-piece C to be laid nearly flat upon the floor when the frame is raised upon said wheels into the position shown in Fig. 2. When the truck is loaded, the wheels $d$ do not sustain any part of the load, the truck and the load being then supported upon a larger pair of wheels, D, which turn freely and independently of each other on an axle, E. To avoid the necessity of raising the large wheels D from the floor in the act of loading the truck, the axle E is adapted to swing about the journals of the small wheels $d$, or about the front end of the truck-frame, being connected to said frame by two rods, E' E², the rear ends of which rods are secured to said axle E, and the front ends of which are bent outward at $e'$ $e^2$ and driven through the side rails, $a'$ $a^2$, or through metallic blocks $a^4$, secured to the front ends of the side rails, one at each end thereof, said blocks being slotted to receive the small wheels $d$, and the bent front ends of the rods E' E² forming the axles on which said small wheels turn.

When the truck is tipped up onto the small wheels into the position shown in Fig. 2, the large wheels will remain upon the floor, the bent ends $e'$ $e^2$ turning in the blocks $a^4$ as the truck is tipped up. The ends of the axle E preferably project outside of the large wheels D, and vertical hangers F' are secured to the under sides of the side rails, $a$ $a'$, and rest upon the axle E, outside of said wheels, when the load is lifted by depressing the handles of the truck, which also raises the small wheels from the floor. The small wheels therefore serve the sole purpose of enabling the lifting-piece to be shoved under a package or bale of merchandise or other load, while the weight of the truck and load, when in motion, rests upon the larger wheels, which, being placed nearer the middle of the truck, more nearly balance the load and require less strength to be used in lifting the handles of the truck.

If the small wheels $d$ were omitted, the truck might be loaded by shoving the toe-piece under the load and then turning the frame about the front lower corners of the side rails, $a$ $a'$, or blocks $a^4$.

I claim as my invention—

1. The combination of the truck-frame, provided with handles and with a lifting-piece, a pair of wheels, and their axle, upon which said wheels turn freely, said axle being connected to the front end of said frame and adapted to swing about said front end, whereby said lifting-piece may be depressed to be pushed under a load without lifting said wheels, as and for the purpose specified.

2. The combination of the truck-frame, provided with handles and with a lifting-piece, a pair of wheels and their axle, upon which said wheels turn freely, and a pair of rods, each secured at one end to said axle and at the other end bent outward in opposite directions through said frame, and turning freely in said frame to allow said lifting piece to be depressed in order to be pushed under a load without lifting said wheels and axle, as and for the purpose specified.

3. The combination of the truck-frame, the lifting-piece, a pair of wheels and their axle, upon which said wheels turn freely, a pair of rods secured at one end to said axle and at the other end bent outward in opposite directions through said frame, and turning freely in said frame, and vertical hangers secured to said frame below the same and adapted to rest upon said axle when the truck-frame is in a nearly horizontal position, as and for the purpose specified.

4. The combination of the truck-frame, provided with handles and with a lifting-piece, a pair of wheels of small diameter journaled at the front end of said frame, and a pair of wheels of larger diameter and their axle, connected to the front end of said frame and adapted to swing about said front end, whereby said lifting-piece may be depressed to be pushed under a load without lifting said larger wheels, as and for the purpose specified.

5. The combination of the truck-frame, the lifting-piece, a pair of wheels of small diameter journaled at the front end of said frame, a pair of wheels of larger diameter and their axle, upon which said larger wheels turn freely, a pair of rods secured at one end to said axle and at the other end bent outward in opposite directions, and serving as the journals of said small wheels, and vertical hangers secured to said frame below the same and adapted to rest upon said axle when the truck-frame is in a nearly horizontal position, as and for the purpose specified.

WILLARD C. JAMES.

Witnesses:
ALBERT M. MOORE,
GERTRUDE M. DAY.